United States Patent [19]

Kitano et al.

[11] Patent Number: 4,597,479
[45] Date of Patent: Jul. 1, 1986

[54] CLUTCH AND BRAKE UNIT

[75] Inventors: Seiichi Kitano, Shijyonawate; Yukio Ono, Katano, both of Japan

[73] Assignee: Kabushiki Kaisha Daikin Seisakusho, Japan

[21] Appl. No.: 707,637

[22] Filed: Mar. 4, 1985

Related U.S. Application Data

[62] Division of Ser. No. 335,330, Dec. 29, 1981, Pat. No. 4,515,256.

[30] Foreign Application Priority Data

Jan. 20, 1981 [JP] Japan .............................. 56-7113[U]

[51] Int. Cl.$^4$ ............................................. F16D 67/02
[52] U.S. Cl. ................................................ 192/18 R
[58] Field of Search .................. 192/18 R, 18 A, 18 B

[56] References Cited

U.S. PATENT DOCUMENTS

| | | | |
|---|---|---|---|
| 2,918,832 | 12/1959 | Meyers | 192/18 A |
| 3,292,753 | 12/1966 | Svaty et al. | 192/18 R |
| 4,352,266 | 10/1982 | Lloyd et al. | 192/18 R |

Primary Examiner—George H. Krizmanich
Attorney, Agent, or Firm—Armstrong, Nikaido, Marmelstein & Kubovcik

[57] ABSTRACT

A wet clutch accompanying rotation preventing device for use in a wet clutch unit which keeps a clutch hub of an input shaft side engaged with a clutch case by spline fitting the clutch case onto an output shaft freely movably in the axial direction and by utilizing an elastic force of a clutch spring; in which an annular friction plate forming a frictional surface on its flank is fitted onto the clutch case so as to rotate just together with the case and so as to be restricted its movement thereto in the axial direction, a stationary member for braking the clutch case facing towards the frictional surface of the friction plate with a clearance kept between them, the clutch unit is disengaged and simultaneously said frictional surface of said friction plate contacts with the stationary member to brake the clutch case when the clutch case is moved in the axial direction in order to disengage the clutch unit.

3 Claims, 6 Drawing Figures

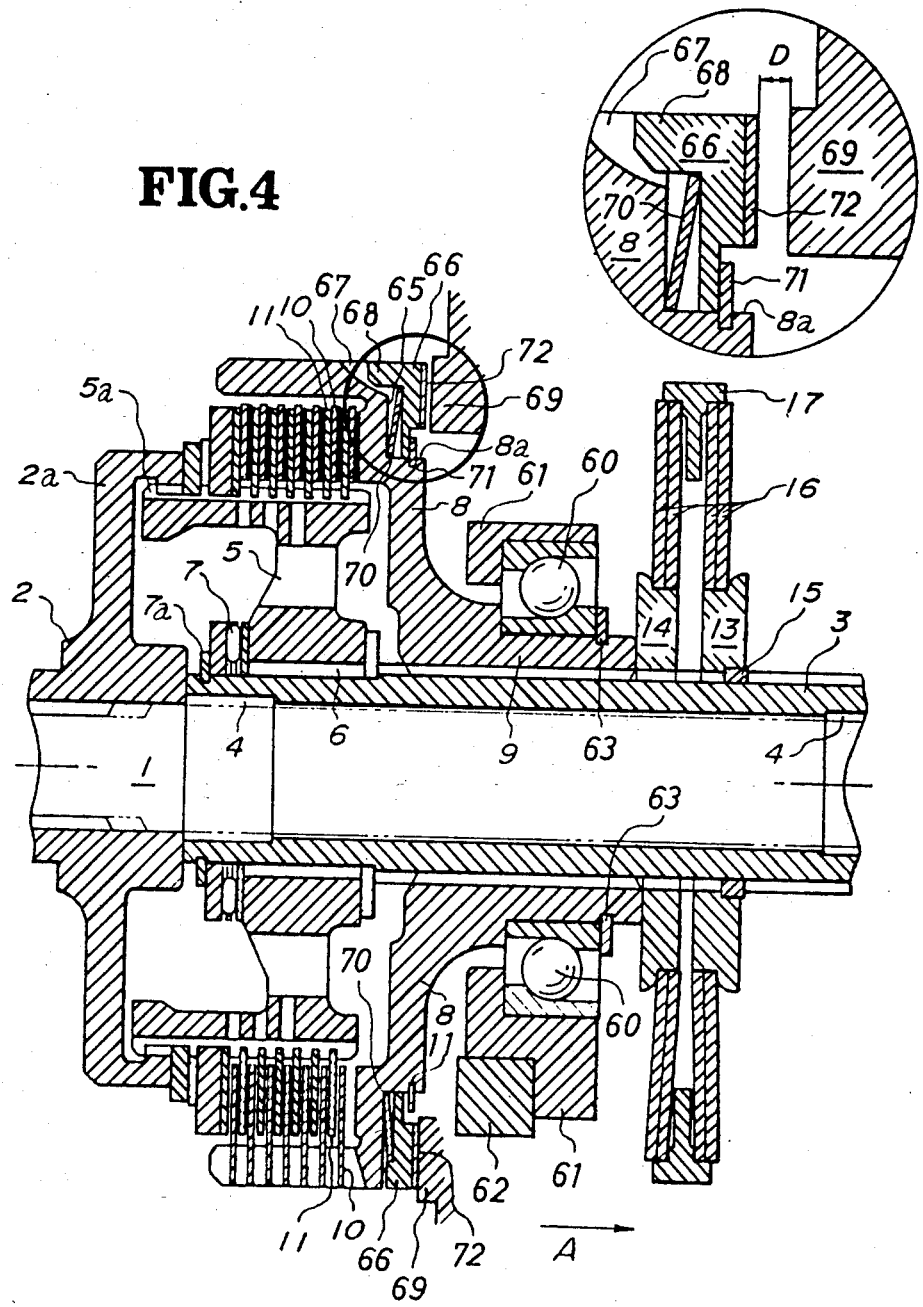

CLUTCH AND BRAKE UNIT

This is a division, of application Ser. No. 335,330, filed Dec. 29, 1981, now U.S. Pat. No. 4,515,256.

FIELD OF THE INVENTION

This invention relates to a clutch & brake device.

SUMMARY OF THE INVENTION

An object of the invention is to provide a clutch and brake device which can disengage a clutch unit and simultaneously can prevent accompanying rotation automatically by only executing the clutch disengaging operation.

Another object is to provide a brake device which can certainly prevent accompanying rotation of a clutch case without requiring an additional large operational force to disengage a clutch unit.

A further object is to provide an brake device which can effectively brake a clutch case utilizing a simple mechanism to certainly prevent accompanying rotation thereof when the clutch is disengaged.

In order to accomplish the above mentioned objects, in the present invention the brake device is so constructed in a clutch unit, which keeps a clutch hub of an input shaft side engaged with a clutch case by spline fitting the clutch case onto an output shaft freely movably in the axial direction and by utilizing elastic force of a clutch spring. An annular friction plate forming a frictional surface on its flank is fitted onto the clutch case so as to rotate together with the case and so as to be restricted its movement in the axial direction. A stationary member for braking the clutch case is made face towards the frictional surface of the friction plate with a clearance kept between them. The clutch unit is disengaged and simultaneously the frictional surface of said friction plate contacts with said stationary member to brake the clutch case when the clutch case is moved in the axial direction in order to disengage the clutch unit.

BRIEF DESCRIPTION OF THE DRAWINGS

FIG. 1A is an enlarged view of the area encircled in FIG. 1.

FIG. 4 is a vertical sectional view of a third embodiment.

FIG. 4A is an enlarged view of the area encircled in FIG. 4.

DETAILED DESCRIPTION OF THE INVENTION

Figure 1:
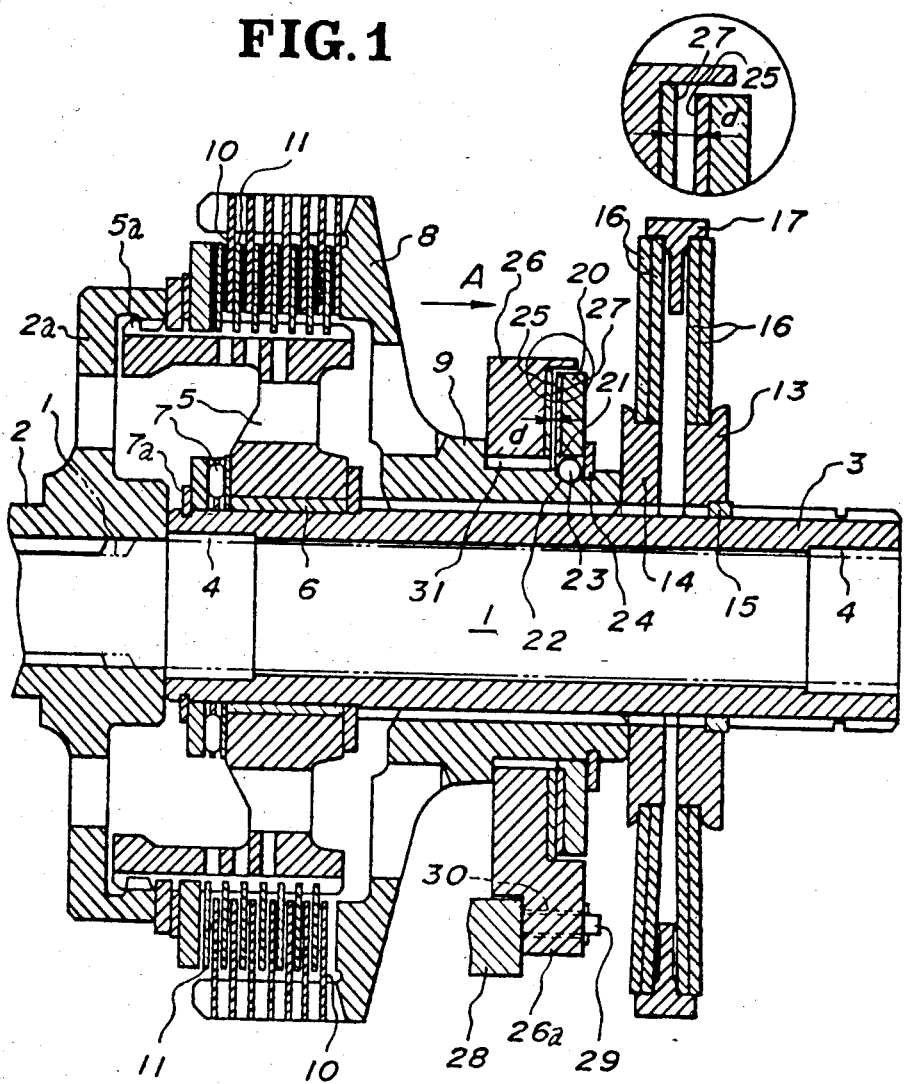
FIG. 1 is a vertical sectional view of the clutch unit provided with the brake device of a first embodiment of the present invention.

FIG. 1 is a view of an embodiment of the present invention showing a clutch for use in transmitting power to a work machine such as an agricultural tractor etc., the upper half illustrating the clutch unit being engaged and the lower half illustrating it being disengaged. In FIG. 1, 1 is an input shaft of an engine side, 2 is an input hub which is spline fitted (at the left end of FIG. 1) onto the input shaft 1, 3 is a hollow output shaft (output shaft) which is, for example, fitted onto the input shaft 1 through a bearing 4 so that it can rotate freely around the input shaft. A clutch hub 5 is fitted onto the outside face of hollow output shaft 3 at the input hub 2 side end through a bearing 6 in such a way that the hub 5 can rotate freely around the hollow shaft 3 but cannot move in the axial direction because of being axially held by a thrust bearing 7 and a snap ring 7a etc. The clutch hub 5 is spline fitted to the input hub 2 at a flange 2a and a section 5a to rotate together with the input hub 2.

A clutch case 8 is spline fitted at its boss 9 onto the external side of the hollow output shaft 3 and can move freely thereon in the axial direction. Many internally pointing driven plates 10 permitted to move only axially are attached to an external cylindrical part of the clutch case 8. Frictional discs 11 permitted to move only axially are attached to an external cylindrical part of the clutch hub 5. Each driven plate 10 is arranged alternatively in between the frictional discs 11.

Annular first and second spring guides 13, 14 are spline fitted onto the output hollow shaft 3 at the opposite side (the right side of FIG. 1) of the clutch case 8 from the input hub 2. The first spring guide 13 (the right side one in FIG. 1) is restricted its movement toward right by a snap ring 15. The second spring guide 14 (the left side one in FIG. 2) contacts with the end surface of the clutch case boss 9. Two disc springs (clutch springs) 16 are fitted and fixed to the outer surfaces of the spring guides 13, 14 respectively. The elastic force of these disc springs 16 forcibly presses the clutch case 8 in the reverse direction of arrow A through the means of the spring guide 14 to keep the clutch case 8 engaged with the clutch hub 5. A guide ring 17 is provide between peripheries of the disc springs 16.

An annular friction plate 20 is coupled onto the outer surface of the clutch case boss 9. Namely, several notches 21 are formed on an inner surface of the friction plate 20, outwardly-expanding-corn-shaped recesses 22 are formed on the peripheral surface of the boss 9 corresponding to the above notches 21, and balls 23 are arranged in between the above notches 21 and the recesses 22 to permit the friction plate 20 always rotate together with the boss 9. The friction plate 20 is restricted its movement toward the right in FIG. 1 by a snap ring 24. A frictional surface 25 is formed on the left side surface of the friction plate 20 in FIG. 1 by adhering a frictional material thereto.

A release sleeve (a stationary member for braking the clutch case) 26 is arranged at the input hub 2 side of the friction plate 20 with a clearance d maintained between the frictional surface 25 and the sleeve, a frictional surface 27 being formed on the surface facing fowards the frictional surface 25 of the friction plate 20. On this sleeve 26, projections such as a pair of outwardly-extending arms 26a (shown in lower half of FIG. 1) are formed and an axially operated release yoke contacts therewith from the input hub 2 side (from the left side of FIG. 1). A pin 29 parallel with the hollow output shaft 3 is fixed to the release yoke and is inserted into a hole 30 provided on the arm 26a. The sleeve 26 itself fits onto an outer surface of the boss 9 through a bearing 31. Therefore, the sleeve 26 can move in the axial direction together with the release yoke 28, but cannot rotate because of being restricted in the rotational direction by the pin 29 of the release yoke 28.

Functioning of the present invention is described in detail hereunder. As illustrated in the upper half of FIG. 1, when the clutch is engaged, the fixed clearance d is kept between the frictional surface 27 of the sleeve 26 and the frictional surface 25 of the friction plate 20, and the clutch case 8 is not braked by the sleeve 26.

When the release yoke 28 is moved in the direction of arrow A for the purpose of disengaging the clutch unit, first the sleeve 26 moves by the distance corresponding to the clearance d to cause the contact between both the frictional surfaces 27, 25 of the sleeve 26 and the friction plate 20; then the clutch case 8 moves in the direction of arrow A against the elastic force of the disc springs 16 through the means of the friction plate 20 and the snap ring 24 to cause disengagement of the clutch unit as illustrated in the lower half of FIG. 1. During disengaging of the clutch unit as mentioned above, a braking torque (which brakes the clutch case 8) begins to be generated between the frictional surfaces 25, 27 due to the elastic force of the disc springs 16 after these frictional surfaces 25, 27 contact each other. Thus, rotation of the clutch case 8 can be securely stopped until the disengaging is completed. Accordingly, the accompanying rotation can be completely prevented as described above.

When using the device having the mechanism as illustrated in FIG. 1, since no special means such as spring etc. is required, the quantity of necessary components is minimized and the clutch mechanism is simplified. Further, no special additional operating force for preventing the accompanying rotation is required, but only the force necessary for disengaging the clutch unit is enough to prevent the accompanying rotation simply and securely. Namely, the operating force (releasing load) which moves the clutch case 8 in the direction of arrow A against the elastic force of the disc spring 16 not only disengages the clutch unit but also securely brakes the clutch case 8 and prevents the accompanying rotation thereof because the mechanism is so designed that the braking torque is generated between the sleeve 26 and the friction plate 20 utilizing the elastic force of the disc springs (clutch springs) 16, which forcibly presses the clutch case 8 to cause the engaged condition between the clutch case 8 and the clutch hub 5. Thus, no special spring etc. for generating the braking torque is used.

Figure 2:
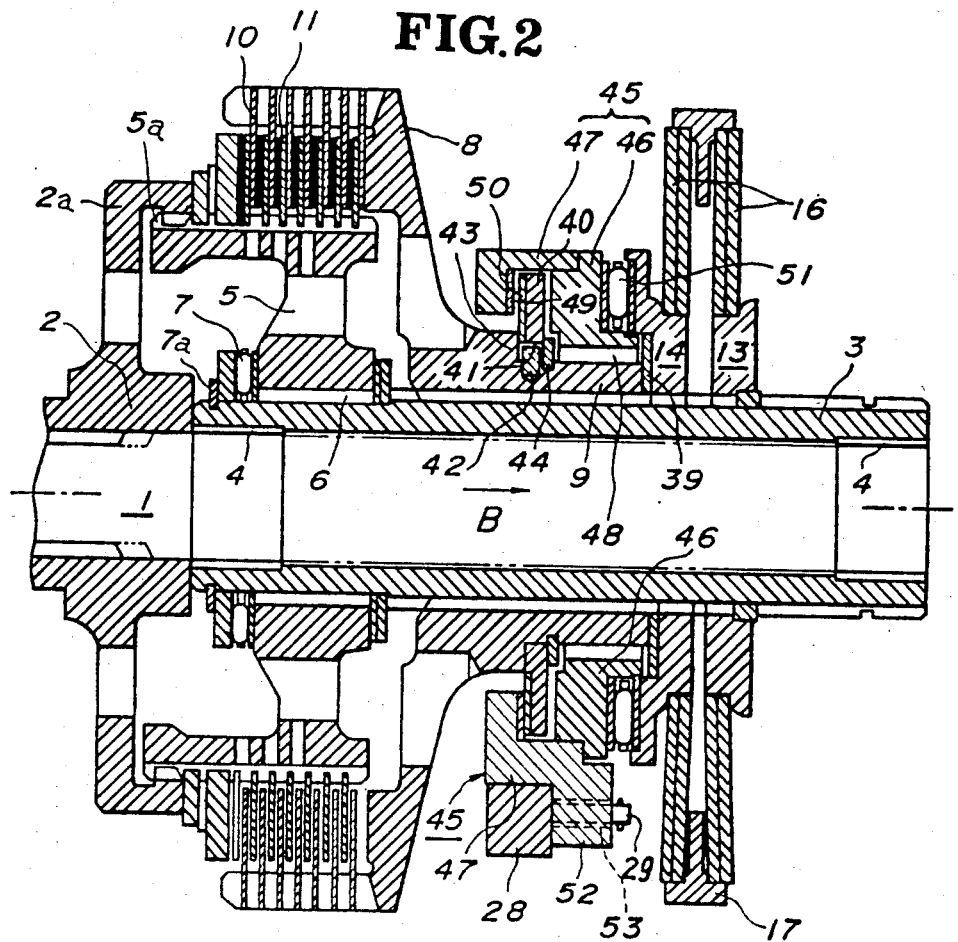
FIG. 2 is a vertical sectional view of a second embodiment.

FIG. 2 is a vertical sectional view of another embodiment, the upper half illustrating the clutch being engaged and the lower half illustrating it being disengaged as in the case with FIG. 1. Components having the same constructions with those in FIG. 1 are numbered with the same reference numerals, and detailed descriptions therefore are omitted. In FIG. 2, a corrugated braking disc spring 39 is arranged in between a flank on the clutch case 8 side of a second spring guide 14 and the end surface of the clutch case boss 9. The elastic force of the disc springs (clutch springs) 16 presses the clutch case 8 in the reverse direction of arrow B through the means of the spring guide 14 and the corrugated braking disc spring 39 to keep the clutch case 8 engaged with the clutch hub 5 as illustrated in the upper half of FIG. 2.

An annular friction plate 40 having a frictional surface 50 on its flank is coupled onto the outer surface of the boss 9 as mentioned below. Namely, several notches 41 are formed on an inner surface of the friction plate 40, radially projecting pins 42 are fixed on the peripheral surface of the boss 9 corresponding to the above notches 41. The pins 42 are set in the notches to permit the friction plate 40 always rotate together with the boss 9. A shoulder 43 of the boss 9 in combination with a snap ring 44 restricts axial movement of the friction plate 40.

A release sleeve (a stationary member for braking the clutch case) 45 comprises an annular block 46 and a sleeve body 47 which is fixed solidly to the block. The block 46 is fitted onto the boss 9 nearer to the disc springs 16 side than the friction plate 40 through the means of a bearing 48 so that the boss 9 can rotate freely. The body 47 extends across the peripheral end of the block 46 beyond the outer surface of the friction plate 40 to the reverse side of the disc spring 16 (the left side of FIG. 2). A frictional surface 49 is formed facing towards the friction plate from the reverse side of the disc spring 16 with the clearance d maintained between the plate and the surface 49. The disc springs 16 side end surface of the block 46 contacts with a peripheral end surface of the block 46 side of the second spring guide 14 through the means of a thrust bearing 51. Several arms 52 (shown in lower half of FIG. 2) are formed on a periphery of the body 47 spaced equally around it, and a release yoke 28 is connected to the arms 52.

An element such as a pin 29 parallel with the hollow output shaft 3 is fixed to the release yoke. The pin 29 is inserted into a hole 53 on the arm 52, and restricts movement of the sleeve 45 in the rotational direction.

Functioning of the clutch unit shown in FIG. 2 is described in detail hereunder. When the clutch unit is engaged as illustrated in the upper half of FIG. 2, the distance d is kept between the frictional surface 49 of the sleeve 45 and the frictional surface 50 of the friction plate 40, and the clutch case 8 is braked by the sleeve 26.

When the release yoke 28 is moved in the direction of arrow B in FIG. 2 for the purpose of disengaging the clutch unit, the sleeve 26 moves through the distance corresponding to the clearance d to push forth the second spring guide 14 through the thrust bearing 51 against an elastic force of the disc springs 16, thus decreasing clutch load (a force by which the clutch case 8 is pressed in the left side of FIG. 2) applied on the clutch case 8 from the disc springs 16. When pushing the sleeve 45 further in the direction of arrow B after the frictional surfaces 49, 50 have contacted each other, the clutch case is pushed forth in the direction of arrow B through the means of the friction plate 40 and the snap ring 44 to cause the disengagement of the clutch unit. At this moment the braking torque is generated between the frictional surfaces 49, 50 by the elastic force of the braking corrugated disc spring 39 to securely stop the rotation of the clutch case 8.

In the mechanism as illustrated in FIG. 2, no large operating force is required notwithstanding the use of the braking corrugaged disc spring 39. Moreover, the braking torque can be controlled at will by changing the elastic force of the braking corrugated disc spring 39.

Figure 3:
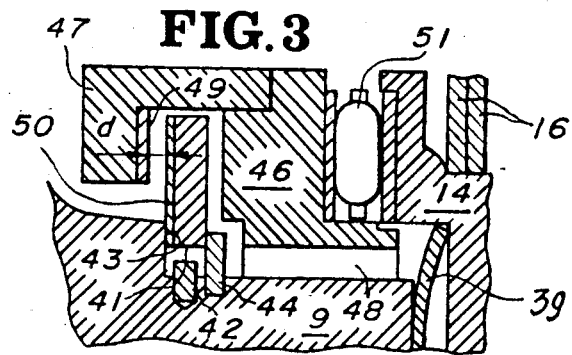
FIG. 3 is an enlarged sectional view of an essential part of FIG. 2.

FIG. 3 is an enlarged sectional view of an essential part of FIG. 2.

FIG. 4 is a vertical sectional view of a further embodiment, the upper half illustrating the clutch unit being engaged and the lower half illustrating it being disengaged. In FIG. 4, the clutch case 8 is spline fitted at its boss 9 onto the outside surface of the hollow output shaft 3 freely movably in the axial direction. A release sleeve 61 is fitted onto the outer surface of the boss 9 through a bearing 60. A release yoke 62 is connected to this release sleeve 61. Therefore, when the release yoke 62 is moved in the direction of arrow A, the clutch case 8 is pushed forth in the direction of arrow A through the means of the sleeve 61, the bearing 60, and a snap ring 63 which holds the bearing 60. Many internally pointing driven plates 10 are attached to the peripheral cylindrical part of the clutch case 8, many externally pointing frictional discs 11 are attached to the peripheral cylindrical part of the clutch hub 5, the above each driven plate 10 being alternatingly arranged in between each frictional disc 11.

A shoulder 65 facing towards the clutch spring 16 is formed at the end surface of the clutch case periphery (the right side in FIG. 4). An annular friction plate 66 facing towards the shoulder 65 is fitted onto an outside of a small diametral part 8a of the clutch case 8 and is freely movably in the axial direction. Several notches 67 are formed on an external periphery of the clutch case 8 spaced equally in the circular direction. An equal number of projections 68 extending toward the shoulder 65 side are provided on the friction plate 66 in positions corresponding to the above notches 67. Thus the clutch case 8 can rotate together with the friction plate 66 by coupling the projections 68 to the notches 67.

A disc spring 70, which forcibly presses the friction plate 66 towards a fixed wall 69 (the stationary member for braking the clutch case such as, for example, a part of a clutch housing), is set between the shoulder 65 and the frictional plate 66. The friction plate 66 is axially stopped by a snap ring 71 so that a settled distance D can be maintained between the fixed wall 69 and the friction plate 66 when the clutch is engaged (the upper half in FIG. 4). A frictional material 72 is stuck to a frictional surface (the right side surface in FIG. 4) of the friction plate 66.

Functioning of the invention is described in detail hereunder. When the release yoke 62 pushes forth the clutch case 8 through the sleeve 61 etc. from the position of the upper half in FIG. 4 in the direction of arrow A against the elastic force of the disc springs 16, the clutch unit begins to disengage. After the clutch case 8 has moved by the distance corresponding to the clearance D, the friction plate 66 begins to be pressed against the fixed wall 69 by means of the elastic force of the disc spring 70, and braking torque is generated between the friction plate 66 and the fixed wall 69 to stop the rotation of the clutch case 8.

In accordance with this invention as described above, the friction plate, which rotates together with the clutch case and is restricted its movement in the axial direction, is fitted onto the clutch case, that the stationary member is made face towards the frictional surface thereof with the clearance kept between them in the axial direction. The frictional plate contact with the stationary member to cause the braking effect on the clutch case when the clutch case is moved in the axial direction in order to disengage the clutch unit. Therefore, only disengaging of clutch makes it possible to disengage the clutch and at the same time to brake the clutch case. Accordingly, the accompanying rotation can be simply and securely prevented without any special operation for preventing it.

Additional advantages of the invention are as follows:
(1) The annular friction plate 20 (40) is fitted to the outside of the clutch case boss 9, and the frictional surface 27 (49), which faces towards the frictional surface 25 (50) of the above friction plate 20 (40) with the axial clearance d remained between the surfaces 27 (49), 25 (50), is formed on the release sleeve 26 (45) which is connected to the release yoke 28 and restricted its movement in the rotational direction; so that only the operating force necessary for disengaging the clutch unit is enough to prevent the accompanying rotation simply and securely without requiring any special operating force for preventing the accompanying rotation.

As a means to fit the friction plate 20 (40) to the clutch case boss 9, the application is not only limited to those shown FIG. 1 and FIG. 2 utilizing the ball 23 or the pin 42 etc. but also may be considered to cover those utilizing a key etc. or spline fitting the boss 9 and the friction plate 20 (40) to make the friction plate 20 (40) rotate together with the boss 9.

Moreover, the means of restricting the movement of the sleeve 26 (45) in the rotational direction is not limited to connecting the pin 29 to the release yoke 28. After all, the sleeve 26 (45) is only required to be connected to a non rotational body such as the release yoke 28 or the clutch housing for the purpose of restricting the movement thereof in the rotational direction.

Further, additional advantages of the invention are as follows:
(1) The mechanism is extremely simple, so the assembly work becomes very easy since the fixed wall 69 such as the clutch housing is utilized and required components assembled in the clutch case 8 are limited only to the spring 70, the friction plate 66 and the snap ring 71.
(2) As the friction plate 66 is arranged on the outer periphery of the clutch case 8, a large braking torque can be generated to securely prevent the accompanying rotation of the clutch case 8.

The frictional material 72 is stuck to the friction plate 66 in FIG. 4, however, an other friction plate 66 to which the frictional material 72 is not stuck may be used. Further, as a means of rotating the friction plate 66 together with the clutch case 8, a key may be used or the friction plate 66 may be spline fitted to the clutch case.

What is claimed is:
1. A clutch and brake device comprising:
a clutch housing having an annular fixed wall;
an output shaft aligned with said housing;
an input shaft;
a clutch hub rotationally connected to said input shaft;
a clutch case spline mounted on said output shaft and axially movable therealong between a first position engaging said clutch hub for driving said output shaft with said input shaft and a second position disengaging said clutch hub and discontinuing said drive of said output shaft with said input shaft, said case having a periphery and a shoulder provided around said periphery facing said annular fixed wall;
spring means urging said clutch case towards said first engaging position;
means for moving said clutch case from said first engaging position to said second disengaging position against the urging of said spring means, and
an annular friction plate attached to said periphery of said clutch case so as to be moved rotationally and axially therewith and facing said fixed wall, said friction plate having a frictional surface extending radially of said output shaft;
whereby, when said means for moving said clutch case is operated to move said case from said first engaging position to said second disengaging position, said frictional surface contracts said fixed wall to brake said output shaft.

2. A clutch and brake device as set forth in claim 1, wherein further spring means urge said friction plate towards said fixed wall and stop means are fixed to said clutch case limiting axial movement of said friction plate urged by said further spring means.

3. A clutch and brake device as set forth in claim 1, wherein said friction plate has a plurality of projections axially extending away from said fixed wall, and said periphery of said clutch case has a plurality of notches corresponding to said projections into which said projections extend.

* * * * *